Patented Dec. 5, 1922.

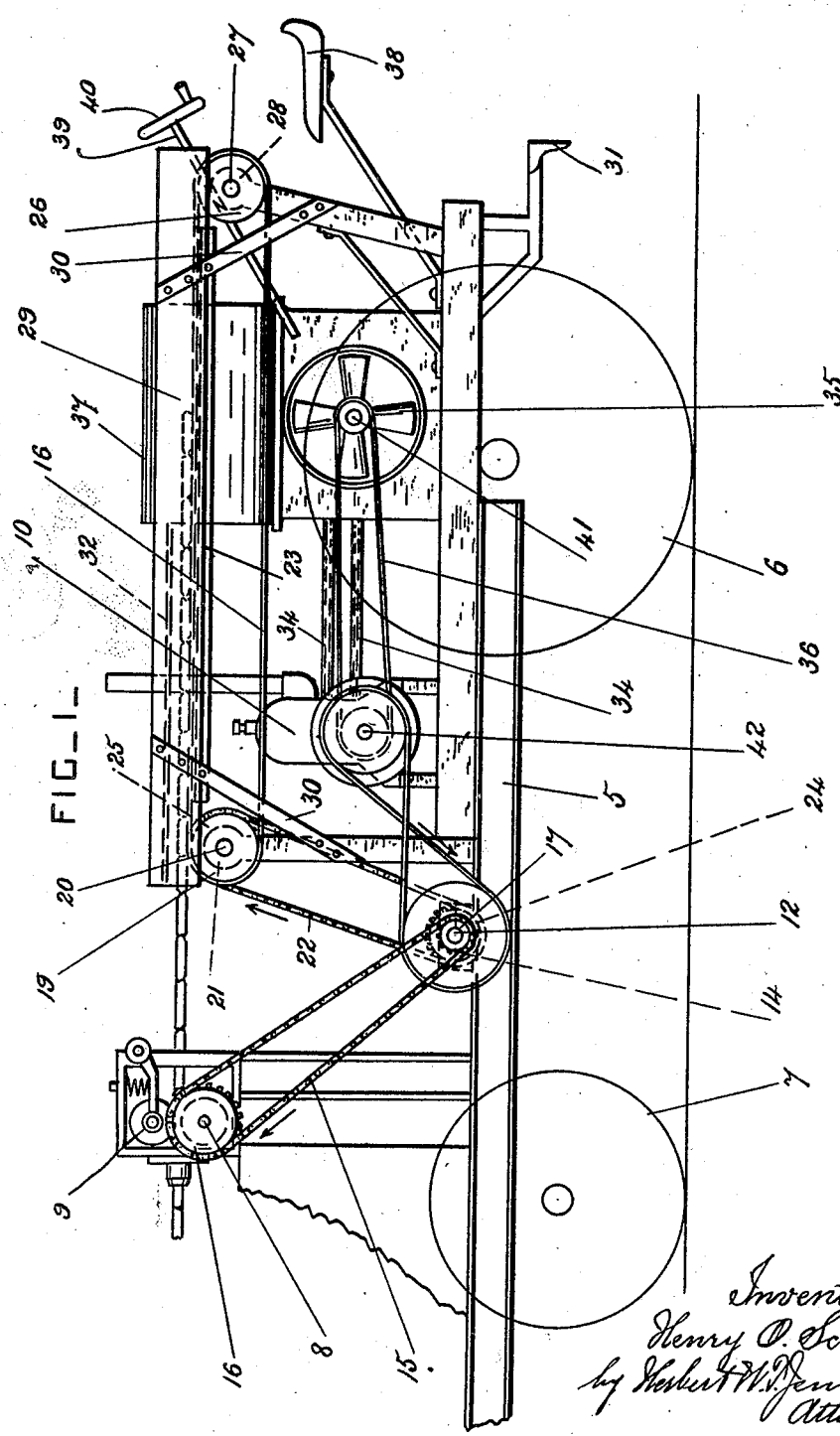

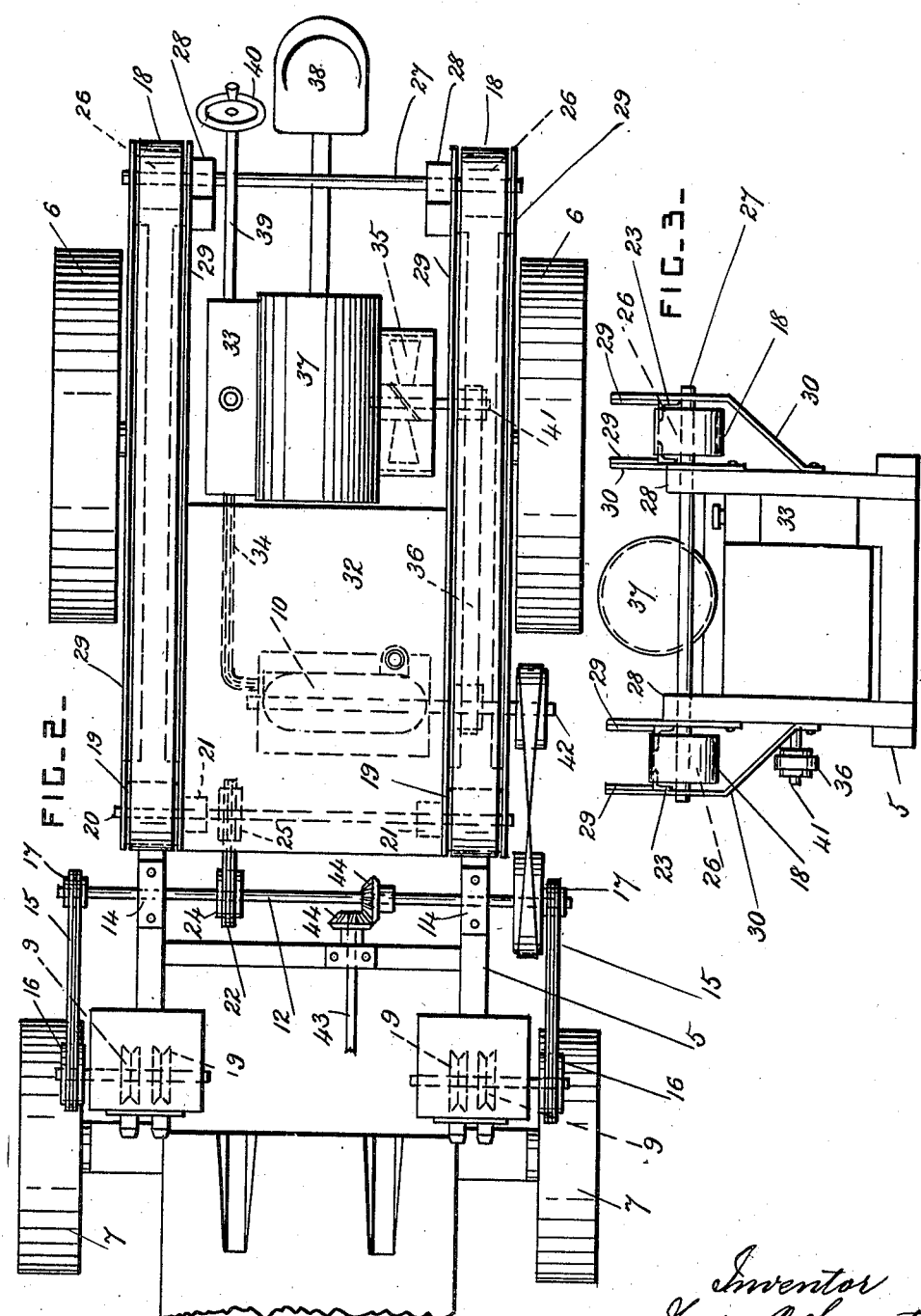

1,437,914

UNITED STATES PATENT OFFICE.

HENRY OSBERT SCRANTON, OF JEANERETTE, LOUISIANA.

LOADING MECHANISM.

Application filed August 17, 1921. Serial No. 493,149.

*To all whom it may concern:*

Be it known that I, HENRY O. SCRANTON, a citizen of the United States, residing at Jeanerette, in the parish of Iberia and State of Louisiana, have invented certain new and useful Improvements in Loading Mechanism, of which the following is a specification.

This invention relates to loading mechanism for use in connection with machines for harvesting sugar canes; and it consists in the novel construction and combination of the parts hereinafter fully described and claimed whereby the canes after being cut down, topped and stripped are loaded onto trailer trucks.

In the drawings, Figure 1 is a side view of a loading mechanism constructed according to this invention. Fig. 2 is a plan view of the same. Fig. 3 is an end view of the conveyers.

In carrying out this invention, a frame 5 is provided which is mounted on rear ground wheels 6 and front ground wheels 7. The front ground wheels 7 are preferably the steering wheels, and they are arranged at the middle part of the length of the frame. The front part of the frame is not shown. The harvesting mechanism for cutting the canes is supported by the front end portion of the frame, and is preferably of the sort shown and described in a separate application for Letters Patent filed August 11, 1920, Serial Number 402,855.

After being cut down the canes are topped and stripped by approved devices for that purpose arranged to the rear of the harvesting mechanism, and of the kind shown in the Letters Patent No. 1,343,589, issued to me on June 15, 1920.

The stripping devices have lower and upper discharging rollers 8 and 9 arranged in pairs, and one roller 8 of each pair is revolved at a predetermined speed so as to draw the canes through the stripping tubes or knives, and discharge them rearwardly. Two pairs of rollers 8 and 9 are preferably provided at each side of the machine.

According to the present invention the canes are loaded onto trailer trucks, and loading mechanism as hereinafter described is arranged on the rear end portion of the frame 5 for loading the canes onto the trucks which are coupled to the rear end of the frame. A motor 10 of approved construction, and preferably an internal combustion engine, is arranged on the frame at about the middle of its width. This motor drives a main driving shaft 12 journaled in bearings 14, and arranged crosswise of the frame 5 between the stripping devices and the loading mechanism. This shaft 12 drives the discharging rollers 8 by means of drive chains 15 which pass over sprocket wheels 16 on the roller shafts and over sprocket wheels 17 on the shaft 12.

Two endless conveyer aprons 18 are provided, and are arranged one at each side of the frame 5. The aprons pass over front rollers 19 which are secured on a single shaft 20 arranged crosswise of the frame 5 and journaled in bearings 21. The shaft 20 is driven by a drive chain 22 which passes over a sprocket wheel 24 secured on the main driving shaft 12, and over a sprocket wheel 25 secured on the shaft 20. This driving mechanism is proportioned so that the conveyer aprons are driven at a greater longitudinal speed than the longitudinal speed imparted to the canes in passing between the discharging rollers 8 and 9, which discharge the canes from the stripping tubes or knives.

In order to effect the stripping satisfactorily the rollers 8 are revolved at a predetermined speed, and the canes are moved at an increased speed by the conveyer aprons in order to get them out of the way quickly, and to discharge them onto the trailer trucks to better advantage.

The rear ends of the conveyer aprons pass over rollers 26 secured on a shaft 27 journaled in bearings 28 on the frame. The conveyer aprons are arranged substantially horizontal, and outside the frame 5, and longitudinal guide plates 29 are supported from the frame and are arranged one at each side of the top stretch of each conveyer apron. These guide plates are supported by brackets 30 secured to them and to the frame 5. The edges of the upper stretches of the conveyer aprons slide over light angle iron guides 23 which are secured to the brackets 30. The conveyer aprons and the vertical guide plates 29 form chutes into which the canes are discharged by the rollers 8 and 9, and the aprons accelerate the motion of the canes after the discharging rollers let go of them.

The trailer trucks are of any approved make, and they are coupled to a drawbar 31 at the rear of the frame 5. When one truck is filled with canes, it is uncoupled and an empty truck is substituted for it.

A cover plate 32 is secured over the motor to protect it from the weather, and a radiator 33 is arranged on the frame 5 to the rear of the motor, and is connected with it by circulating water pipes 34. A fan 35 is provided for cooling the radiator, and is driven from the motor by a belt 36 and suitable belt pulleys. A tank 37 for oil or other liquid hydrocarbon fuel is supported above the fan and radiator, and is suitably connected with the carbureter of the motor. A seat 38 for the driver is arranged at the rear end of the frame; and 39 is an inclined steering shaft provided with a hand wheel 40, and arranged in convenient proximity to the seat of the driver. The motor, oil tank, radiator and fan are arranged at the middle part of the width of the frame, and the oil tank projects upwardly in the space between the two conveyers. The fan shaft 41 and the main driving shaft 12 are arranged parallel to the crankshaft 42 of the motor, and crosswise of the frame 5, so that straight driving belts and drive chains can be used to drive all the revoluble shafts. This arrangement permits the driver to have a clear view of the conveyers, and enables him to grasp the canes when necessary, and he is protected from the heat of the motor by the fan casing, radiator and oil tank, which is very desirable in harvesting sugar canes.

A longitudinal shaft 43 is provided for driving the harvesting mechanism, and is driven by beveled toothed wheels 44 from the main driving shaft 12.

What I claim is:

1. In loading mechanism, revoluble rollers for discharging canes, a loading conveyer provided with an endless apron adapted to receive the canes from the discharging rollers, and driving mechanism for the discharging rollers and the conveyer, said mechanism operating to move the conveyer apron at a greater speed than that imparted to the canes by the said discharging rollers.

2. In loading mechanism, a supporting frame, revoluble discharging rollers for canes, two loading conveyers provided with endless aprons adapted to receive the canes from the discharging rollers, said conveyers being arranged parallel to each other and one at each side of the frame, and driving mechanism for the discharging rollers and the conveyer aprons, said mechanism operating to move the conveyers at a greater speed than that imparted to the canes by the said discharging rollers.

3. In a loading mechanism, a supporting frame, revoluble discharging rollers for canes, two loading conveyers for the canes provided with endless aprons and arranged parallel to each other and to the rear of the discharging rollers, a main driving shaft journaled in bearings on the frame and arranged crosswise thereof between the discharging rollers and the conveyers, driving devices for revolving the discharging rollers from the said shaft, and driving devices for operating the two conveyers simultaneously from the said shaft.

4. In a loading mechanism, a supporting frame, an endless conveyer apron, shafts journaled in the frame and provided with rollers which engage with the end portions of the said apron, brackets having their lower parts secured to the frame, vertical guide plates for canes secured to the upper parts of the said brackets and arranged one on each side of the upper stretch of the conveyer apron, and angle-irons also supported by the said brackets and arranged with their upper flanges projecting horizontally under the side portions of the said upper stretch and supporting it between the said rollers.

5. In a loading mechanism, a supporting frame, two conveyers provided with endless aprons and arranged parallel to each other with a space between them, a motor arranged in the front part of the said space, a radiator for cooling the motor and a fan for cooling the radiator arranged in the middle part of the said space, a seat for the driver arranged to the rear of the said space and between the conveyers, and means for driving the said conveyers and fan from the said motor.

In testimony whereof I have affixed my signature.

HENRY OSBERT SCRANTON.